US008712105B2

(12) United States Patent
Rowsell et al.

(10) Patent No.: US 8,712,105 B2
(45) Date of Patent: Apr. 29, 2014

(54) VEHICLE SPEED VERIFICATION SYSTEM AND METHOD

(75) Inventors: Andrew Rowsell, Carnegie (AU); Sime Mardesic, Altona Meadows (AU)

(73) Assignee: Redflex Traffic Systems Pty, Ltd., Victoria (AU)

( * ) Notice: Subject to any disclaimer, the term of this patent is extended or adjusted under 35 U.S.C. 154(b) by 1229 days.

(21) Appl. No.: 12/081,010

(22) Filed: Apr. 9, 2008

(65) Prior Publication Data

US 2009/0046897 A1 Feb. 19, 2009

(30) Foreign Application Priority Data

Apr. 16, 2007 (AU) ................................ 2007201983

(51) Int. Cl.
*G06K 9/00* (2006.01)
(52) U.S. Cl.
USPC ............................ 382/107; 382/104; 382/106
(58) Field of Classification Search
USPC .......... 382/100, 107, 105, 103–104; 340/917, 340/933, 937; 348/145, 154; 356/27; 701/93
See application file for complete search history.

(56) References Cited

U.S. PATENT DOCUMENTS

| | | | | |
|---|---|---|---|---|
| 4,847,772 A * | 7/1989 | Michalopoulos et al. | ..... | 701/117 |
| 5,073,819 A * | 12/1991 | Gates et al. | .................... | 348/140 |
| 5,161,107 A * | 11/1992 | Mayeaux et al. | ............. | 701/117 |
| 5,434,927 A * | 7/1995 | Brady et al. | ................... | 382/104 |
| 6,647,361 B1 * | 11/2003 | Laird et al. | ......................... | 703/8 |
| 6,946,978 B2 * | 9/2005 | Schofield | ................. | 340/995.28 |
| 7,684,593 B2 * | 3/2010 | Chinomi | ....................... | 382/104 |
| 7,711,150 B2 * | 5/2010 | Simon | .......................... | 382/105 |
| 7,729,513 B2 * | 6/2010 | Ohkubo | ........................ | 382/104 |
| 7,881,498 B2 * | 2/2011 | Simon | ........................ | 382/105 |
| 8,050,459 B2 * | 11/2011 | Zhang et al. | .................. | 382/104 |
| 8,050,460 B2 * | 11/2011 | Mueller-Schneiders et al. | ............................. | 382/104 |
| 8,213,685 B2 * | 7/2012 | Wang | ........................... | 382/107 |
| 2004/0015289 A1 * | 1/2004 | Poland et al. | ................. | 701/117 |
| 2004/0101166 A1 * | 5/2004 | Williams et al. | .............. | 382/104 |

* cited by examiner

*Primary Examiner* — Hadi Akhavannik
*Assistant Examiner* — Mehdi Rashidian
(74) *Attorney, Agent, or Firm* — Oliff PLC

(57) ABSTRACT

A method of assessing the speed of a vehicle including the steps of obtaining a first image of a vehicle; obtaining a second image of the vehicle captured at a known time after capture of the first image; selecting a reference point on the vehicle in the first image; and indicating a location in the second image corresponding to a predicted location of the selected vehicle reference point assuming that the vehicle travels at a particular speed between the times of capture of the first and second images.

22 Claims, 10 Drawing Sheets

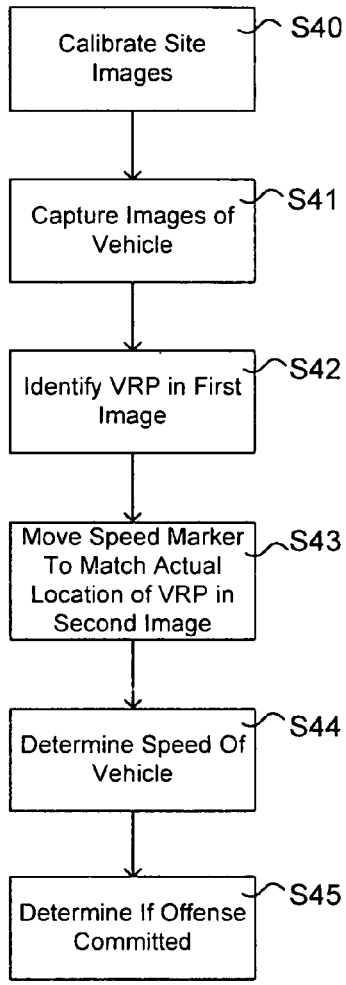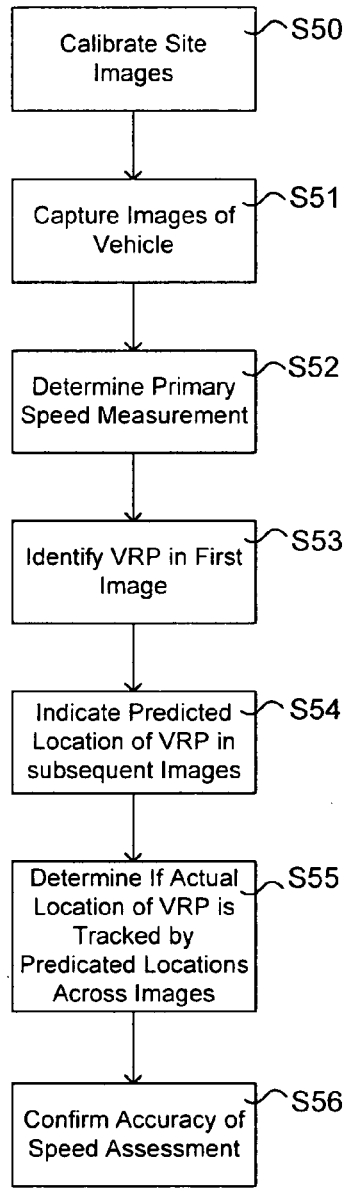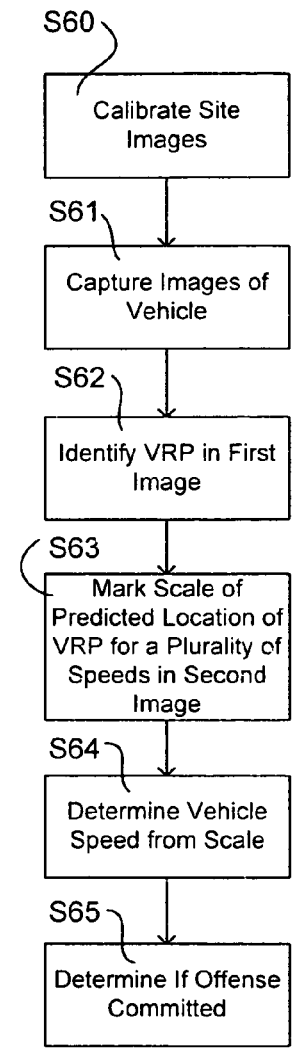
FIG 12
FIG 13
FIG 14

VEHICLE SPEED VERIFICATION SYSTEM AND METHOD

The present invention relates to method, systems and apparatus for the assessment (i.e., verification) of vehicle speed. It has particular application to traffic enforcement systems.

Enforcement systems for traffic speed limits may utilize a number of technologies to detect vehicle speed. For example, radar systems may determine speed from doppler shift, lidar systems may determine speed from the time of flight of IR pulses, and inductive loop systems and piezoelectric strip systems may determine speed from the time taken for a vehicle to travel between two sensor locations.

When properly installed and maintained, these detection systems can be highly accurate. However, there can be reluctance on the part of offenders to accept violation notices based on these systems, and challenges are sometimes made to the correctness of speed measurements. One way to address this is to employ a secondary speed detection system to provide an independent check on the accuracy of a primary detection system. For example, a speed violation ticket may issue only if a secondary speed determination is within ±2% to ±10% of a primary speed determination.

A primary system may for example use any of the above technologies, whilst a secondary system will generally use a different technology from that of the primary system, and will generally have a lower accuracy. In one form of secondary system, infra-red beams are directed across a roadway and speed is determined by the beam breakage times. In another system, a pair of piezoelectric strip sensors and a pair of inductive loop sensors are interleaved, so that the time of travel between the piezoelectric strips provides the primary speed and the time of travel between the inductive loops provides the secondary speed. In another system, road markings are provided on the road at regular intervals, and a determination of vehicle speed is made by determining from photographic evidence the number of road markings that are crossed.

The present invention aims to provide new speed assessment methods, apparatus and systems that in their various embodiments may have a number of advantages, and that may for example be used in secondary speed determinations.

Viewed from one aspect, the present invention provides a method of assessing vehicle speed including the steps of:
obtaining a first image of a vehicle;
obtaining a second image of the vehicle captured a known time after capture of the first image;
selecting a vehicle reference point in the first image; and
indicating a location in the second image corresponding to a predicted location of the selected vehicle reference point assuming that the vehicle travels at a particular speed between the times of capture of the first and second images.

The method may provide an assessment of vehicle speed by comparing an actual location of a vehicle reference point in an image with a predicted location. If the actual location corresponds to the predicted location, then it can be concluded that the vehicle was travelling at the speed used in the prediction calculations.

The method can provide an accurate assessment of vehicle speed using time-separated vehicle images, and can provide an intuitive method of speed assessment through visual matching.

The method may facilitate acceptance of a violation notice by an offender and also provide strong evidence before an enforcement authority, such as the courts, as the images of the vehicles, and of markers used to indicate the vehicle reference points and predicted locations, provide a visualisation of the offence that may be more persuasive than merely a recorded speed.

Another advantage is that the images, with for example markings showing the vehicle reference point and predicted location, may provide transparency in the assessment process, and may clearly show the methodology and actions taken in the assessment.

Also, changes in the surrounding environment between the images, including movement of the offending vehicle relative to objects of generally understood size and movement relative to other vehicles and the like may provide further supporting confirmation of speed and that nothing untoward has occurred in the assessment process.

The method can take advantage of existing apparatus that is already provided in photo enforcement systems, in which images of vehicles and drivers are taken for identification purposes.

The selection of the vehicle reference point and the comparison of its actual and predicted locations may be carried out automatically, e.g. using image recognition algorithms. Preferably, however, these steps are carried out manually. For example, the first image may be displayed to an operator, who may identify a suitable vehicle reference point and indicate it with a suitable input device, e.g. through a mouse click, a stylus placement on a touchscreen or the like. The second image may then be displayed with the predicted location of the vehicle reference point marked, and the operator may visually determine whether or not the predicted and actual locations match up, and, if they do, may instigate the generation of a violation notice.

Human involvement in the assessment process may further increase confidence in the determination of an offence and so increase acceptance of offence notices, as offenders will know that an offence has been considered by a trained operator. Furthermore, whilst allowing for human input, the method can keep human error low by requiring only a single actual selection of a point in an image by an operator, i.e. the initial selection of a vehicle reference point, and thereafter only requiring a visual check of the vehicle's new position and the predicted position.

The predicted location may be indicated in any suitable manner, e.g. by a dot marker or an arrow. It may be indicated by a line drawn in the second image across the roadway on which the vehicle is travelling, i.e. a line transverse to the travel direction of the vehicle. This can be thought of as defining a "speed front" in the image, across the roadway, that corresponds to the roadway position that the vehicle reference point would have reached if the vehicle were travelling at a particular speed. The use of a line marker can be advantageous, as it may provide perspective information that may help an operator to determine when a vehicle reference point location matches a predicated location. Other markings are also possible, e.g. a 2D shaded or partially transparent plane, transverse to the roadway direction, that may for example cut through the vehicle.

The selection of the reference point in the first image may be similarly indicated. For example, it may be a dot marker, an arrow, or a line providing perspective information. In the latter case, again, the line may provide perspective clues to the operator to assist the operator in determining an accurate selection of an appropriate vehicle reference point. The reference point marker, e.g. line, may be displayed after a reference point is selected, and/or may be movable in the image along the roadway, so that the operator may move the line to locate it at a vehicle point that they wish to select.

The speed associated with the predicted location may take a number of forms. It may be a speed detected by a vehicle speed detector system, e.g. by a radar, lidar, loop or piezo-electric system. In this case, a comparison of the predicted location of the vehicle reference point with its actual position in the image will provide a check on the accuracy of the vehicle speed detector system. If the predicted and actual locations of the vehicle reference point correspond with one another, then a speed violation notice may be issued, whereas if they do not, the vehicle speed detector system may be determined to have erred, and no violation notice will be generated. Such a system may therefore provide a primary and secondary means of determining vehicle speed.

A predicted location of the vehicle reference point may alternatively or also be associated with a fixed speed, e.g. a speed limit of the roadway. This may provide further evidence that a vehicle is speeding, e.g. if the vehicle reference point is shown to be further along the roadway than a marker for its position assuming travel at the relevant speed limit.

A number of predicted locations could be shown for a number of speed limits. This may provide a location/velocity scale to which the position of the vehicle reference point may be compared, so that the vehicle's speed may be determined from the comparison, e.g. to be between speed markers on the scale. This method may again provide a secondary check for a primary speed detection system, although it may also provide a standalone determination, e.g. as a primary detection system itself.

Speeds associated with various predictions may have particular significance, and may relate to speeds at which different penalties, e.g. fines or driving points, are applicable.

A tolerance may be indicated about a predicted location, e.g. by marking a tolerance region about the predicted location. For example, tolerance markers, e.g. parallel lines, e.g. parallel to a predicted vehicle reference point marker line, may be provided assuming speeds plus and minus a tolerance value of the detected speed, e.g. ±10% of the detected speed. If the reference point of the vehicle falls within the tolerance markers, then the vehicle speed detector system may be determined to be sufficiently accurate for a violation notice to be issued, whereas if the reference point falls outside of the tolerance region, the detection system may be determined to have erred, and no violation notice will issue.

In another method of comparing actual and predicted vehicle reference points, a marker provided on the second image, e.g. a line indicating a speed front, may be movable along the roadway in the image, so as to indicate a predicted location of the vehicle reference point for a variety of possible speeds. An operator may then move the marker along the roadway until it aligns with the vehicle reference point selected in the first image, and the system may indicate a speed associated with that marker location, e.g. adjacent the marker. The speed may be displayed and updated constantly as the marker is moved, or may be displayed once a location for the marker has been chosen.

A violation notice may be generated automatically, once the predicated and actual locations of the vehicle reference point are determined to match. The notice need not show the secondary speed image data or indicators and markers, and may merely be a notice that an infringement has occurred. The present method does however allow the various images, indicators and markings to be printed or shown on screen should they be required, e.g. as evidence to a driver who is querying an offence or as evidence before an enforcement authority. Violation notices could also include an image or images of the secondary speed determination indicators and markings, e.g. to show the selected reference point in the first image and the one or more predicted locations in the second image. The secondary determination indicators and markings may be provided on separate images, or may be provided on a composite image, e.g. that overlays the images of the vehicle at its first and second image positions.

The images and relevant offence data may be suitably stored in a manner ensuring appropriate continuity and security of evidence, e.g. using encryption, date-stamping and the like, so that they may be admissible in court proceedings and the like.

The images of the vehicle may be obtained from still cameras and/or video cameras. For example, on detection of a speed violation by a speed detector system, a still camera may capture an image of the vehicle at the time of making the speed determination, and may take a further image a known time afterwards. The time period between images may be fixed or may be varied dependent on the vehicle speed, e.g. so as to provide a suitable vehicle travel distance in the images.

Alternatively, a video sequence may be taken of the vehicle, and the first and second images may be selected from frames of the video sequence that are a fixed or variable number of frames apart. The number of frames apart will correspond to a known time period based on the frame rate at which the video sequence is shot.

The images may be taken at and after the speed detection. The method may also use images from before the speed detection, e.g. by having the system hold images in a memory that may be called up if a speed violation is detected. The images may for example be held in a buffer memory that may discard unused images so as to prevent the need for large amounts of data storage.

A perspective transform may be defined that maps between real-world co-ordinates (corresponding to locations in an enforcement site) and image co-ordinates (pixel locations in images of an enforcement site). The resulting transform may be used to predict the location of the selected vehicle reference point.

The transform may be obtained by identifying real-world calibration features in an enforcement site that are at known distances relative to one another, by associating real-world co-ordinates with the features, by noting their corresponding image co-ordinates in an image of the site, and by determining a transform, e.g. a matrix transform, based on the two sets of co-ordinates. The determination of such perspective transforms are well-known, and may be implemented in a standard manner as known to one skilled in the art.

The calibration features may take any suitable form. They may be temporarily provided at the site, whilst calibration takes place, and may be removed after calibration, or they may be permanent. They may be dedicated calibration features provided at the site, and/or may be features already provided at the site, e.g. lane markings or other permanent traffic signage. Preferably, a rectangular set of points is chosen, with the points spaced sufficiently far apart to provide the transform with a desired level of accuracy.

In order that a simple transform may be used, the method may map between a flat plane at the site and the scene image. The method may for example assume that the roadway on which the vehicle is travelling is flat and may provide a transform between points on the roadway and points in the image (although considered flat, the roadway need not be horizontal, and could for example slope).

The vehicle reference point selected may be a point at which a vehicle contacts the roadway. This will generally be at a point of contact of a tyre with the roadway. Any wheel of the vehicle may be utilized. It may be preferable to use a rear wheel when capturing images of receding vehicles, and to use a front wheel when capturing images of approaching vehicles. This can provide better marking relative to the vehicle, without an operator being distracted by interference between the markings and the vehicle body. Also, the portions of the vehicle closer to the camera when an image is taken will generally have a larger profile in the image, and so will generally be more accurately selected or matched with vehicle reference position indicators and predicted location markings.

Other transforms could be used. For example, a transform may allow for mapping from a three-dimensional space of the enforcement site to two-dimensional images of the site.

The method may include the step of checking that a verification feature in an enforcement site is in a correct location in an image of the site. This can confirm that the image is correctly calibrated, and so may prevent incorrect speed assessments caused by for example a camera being moved from the position in which it was originally calibrated, and will also prevent an offender from arguing that the camera was not calibrated correctly, even if it was. If the verification feature does not appear in the correct image location, an error will be detected and no violation notice will issue. The image may include a verification marker, e.g. a dot, box or other indicia, with which the site verification feature is matched, e.g. the imaged site verification feature may need to be located within or to underlie the verification marker. An operator may be supplied with a description of what site feature should be located at an image verification marker. The operator may verify correct calibration by visually matching image verification markers and site features.

An advantage of using permanent calibration features to determine the perspective transform is that they can also act as verification markers. Also, if an image is deemed to have lost calibration through a misalignment of a verification feature and its associated image marker, the permanent calibration features in the image can be identified remotely and the image recalibrated without having to attend the site.

When selecting a point in an image, such as a vehicle reference point, or when comparing reference points or site verification features with location predication or verification markers, the relevant portion of the image may be enlarged, e.g. as an insert in the image, so as to facilitate the accuracy of the selection or comparison. For example, as an operator moves a pointing device across an image, a portion of the image about the image point pointed to may be tracked and enlarged. This may help an operator to select the vehicle reference point, to compare actual vehicle reference point locations with predicted locations, and/or to compare calibration and/or verification features with calibration and/or verification markers.

More than one vehicle reference point may be selected. For example, an operator may select a point where a front tyre touches the ground and a point where the rear tyre touches the ground as a pair of vehicle reference points, and may compare the actual location of both in the second image against their predicted locations in the image.

The method may also take more than one "second" image, and may determine predicted vehicle reference points for a number of locations, so that it may track the expected locations of the vehicle reference point between a number of images. A comparison can then be made of actual and predicted locations for the vehicle reference point in a number of images, corresponding to a number of known time periods. This can provide further confidence in the accuracy of the vehicle speed determination. The images may comprise a video sequence, with the markings shown in the sequence when played, and the markings may for example be shown on each frame of the video sequence.

The present invention extends to apparatus for implementing the method, and, viewed from a further aspect, the present invention provides vehicle speed assessment apparatus including:

means for obtaining first and second images of a vehicle, the second image captured a known time after the first image is captured;

data processing means for noting a selected reference vehicle point in the first image, and for determining a location in the second image corresponding to a predicted location of the selected reference point assuming that the vehicle travels at a particular speed in the time period between the capturing of the first and second images.

The apparatus may include display means for displaying the images, and input means for allowing an operator to select a vehicle reference point. For example, the input means may include a pointing device such as a computer mouse, a stylus for a touchscreen or the like. The apparatus may include means to allow an operator to indicate whether or not an actual location of the selected vehicle reference point matches a predicted location, and means for generating a violation notice based upon this indication. The apparatus may include vehicle speed detection means for detecting a speed of a vehicle separate from speed calculations based on the images, and may include a memory store in which speed limits at various enforcement sites are stored, so that appropriate predictions can be made for each enforcement site.

The apparatus may comprise a speed detector, a camera and a controller at an enforcement site, which may detect vehicle speeds and record associated images, and a processing centre remote from the enforcement sites that receives the vehicle and image data and that allows an operator to take necessary selection and comparison actions, e.g. to make a secondary speed assessment or a primary speed detection, if appropriate, and to issue violation notices. The control centre may communicate with various detection and imaging apparatus at a plurality of enforcement sites, and may do so in any suitable manner, e.g. by a wireless and/or wired connection and over public and/or private networks.

The apparatus may be configured to take images of approaching and/or retreating traffic. The first and second images may be taken in the same direction or may be taken from different directions. In the latter case, the images will be calibrated separately, and a determination will also be made of distances between co-ordinates in the two images.

The present invention extends to software for providing the present methods and systems, when run on suitable computing apparatus. Viewed from another aspect, therefore, the present invention provides a software product including:

a component for obtaining a first image of a vehicle;

a component for obtaining a second image of the vehicle captured a known time after capture of the first image;

a component for selecting a vehicle reference point in the first image; and a component for indicating a location in the second image corresponding to a predicted location of the selected vehicle reference point assuming that the vehicle travels at a particular speed between the times when the first and second images are captured.

The software product may also include other components, e.g. to allow an operator to select a vehicle reference point, to generate indicators and markings for reference points, predicted locations and calibration verification, and to allow an operator to confirm the accuracy of a predicated location, as well as to generate violation notices and the like and to undertake any other required functions, e.g. as discussed above.

The present invention has particular use in a detection system that has primary and secondary speed assessment ability, and, viewed from a further aspect, the present invention provides a method of verifying the speed of a vehicle determined by a primary vehicle detection speed system, the method including the steps of:

determining a primary speed assessment of a vehicle using the primary vehicle speed assessment method;

determining whether the vehicle has violated a speed limit using said primary speed assessment;

obtaining a first image of a vehicle that is determined to have violated a speed limit;

obtaining a second image of the vehicle, the second image being captured a known time after the capture of the first image;

selecting a vehicle reference point in the first image;

indicating in the second image an expected position of the selected vehicle reference point assuming that the vehicle travels at the primary speed assessment between capture times of the first and second images; and determining whether an actual location of the vehicle reference point in the second image corresponds with the expected location of the vehicle reference point, e.g. within an acceptable tolerance.

The use of a plurality of speed markers, e.g. to provide a speed scale, is also advantageous, and, viewed from another aspect, the present invention provides a method of assessing the speed of a vehicle, the method including the steps of:

obtaining a first image of a vehicle;

obtaining a second image of the vehicle captured a known time after the first image is captured;

selecting a vehicle reference point in the first image;

indicating in the second image a plurality of speed markers, each corresponding to a predicted location of the selected vehicle reference point assuming that the vehicle travels at a particular speed between capture times associated with the first and second images; and determining a speed for the vehicle based on a comparison of an actual location of the selected vehicle reference point in the second image with the speed markers.

The ability to move an expected vehicle reference point marker is also useful in determining vehicle speed, and, viewed from a further aspect, the present invention provides a method of assessing vehicle speed, the method including the steps of:

obtaining a first image of a vehicle;

obtaining a second image of the vehicle captured a known time after the capture of the first image;

noting the selecting of a vehicle reference point in the first image;

displaying a movable marker in the second image corresponding to a predicted location of the selected vehicle reference point assuming that the vehicle travels at a particular speed;

monitoring movement of the marker in the second image; and determining a speed associated with the movable marker based on a location of the marker in the second image.

As the marker moves, the speed may be shown at which the vehicle would have needed to travel in order for the selected vehicle reference point to reach the marker position. The marker may then for example be brought into alignment with the reference point on the vehicle to show the vehicle's actual speed. Various speed markers could be put down on the image at selected points as the marker is moved, e.g. by clicking on a pointing device that moves the marker to fix the marker in place.

Tracking a vehicle reference point over a number of images is also useful for confirming vehicle speed, and, viewed from a further aspect, the present invention provides a method of assessing vehicle speed, the method including the steps of:

obtaining a first image of a vehicle;

obtaining further images of the vehicle captured at known times after the capture of the first image;

selecting a vehicle reference point in the first image;

placing in the further images a marker corresponding to a predicted location of the selected vehicle reference point in the further images assuming that the vehicle travels at a particular speed between the images; and monitoring whether the markers track the selected vehicle reference point in the further images.

The present invention also extends to apparatus and software for carrying out the above methods.

The present invention further extends to images or violation notices generated in accordance with any of the present methods or systems. It extends to an image, a set of images or a video sequence showing a vehicle on a roadway, a vehicle reference point and a predicted location for the vehicle reference point assuming a particular vehicle speed. It also extends to a violation notice including such an image or set of images.

It should be noted that any one of the aspects mentioned above may include any of the features of any of the other aspects mentioned above and may include any of the features of any of the embodiments described below.

Embodiments of the present invention will now be described, by way of example only, with reference to the accompanying drawings. It is to be understood that the particularity of the drawings does not supersede the generality of the preceding description of the invention.

In the drawings:

FIG. 12 is a flowchart of another method of vehicle speed assessment;

FIG. 13 is a flowchart of a further method of vehicle speed assessment; and

FIG. 14 is a flowchart of another method of vehicle speed assessment.

Figure 1A:
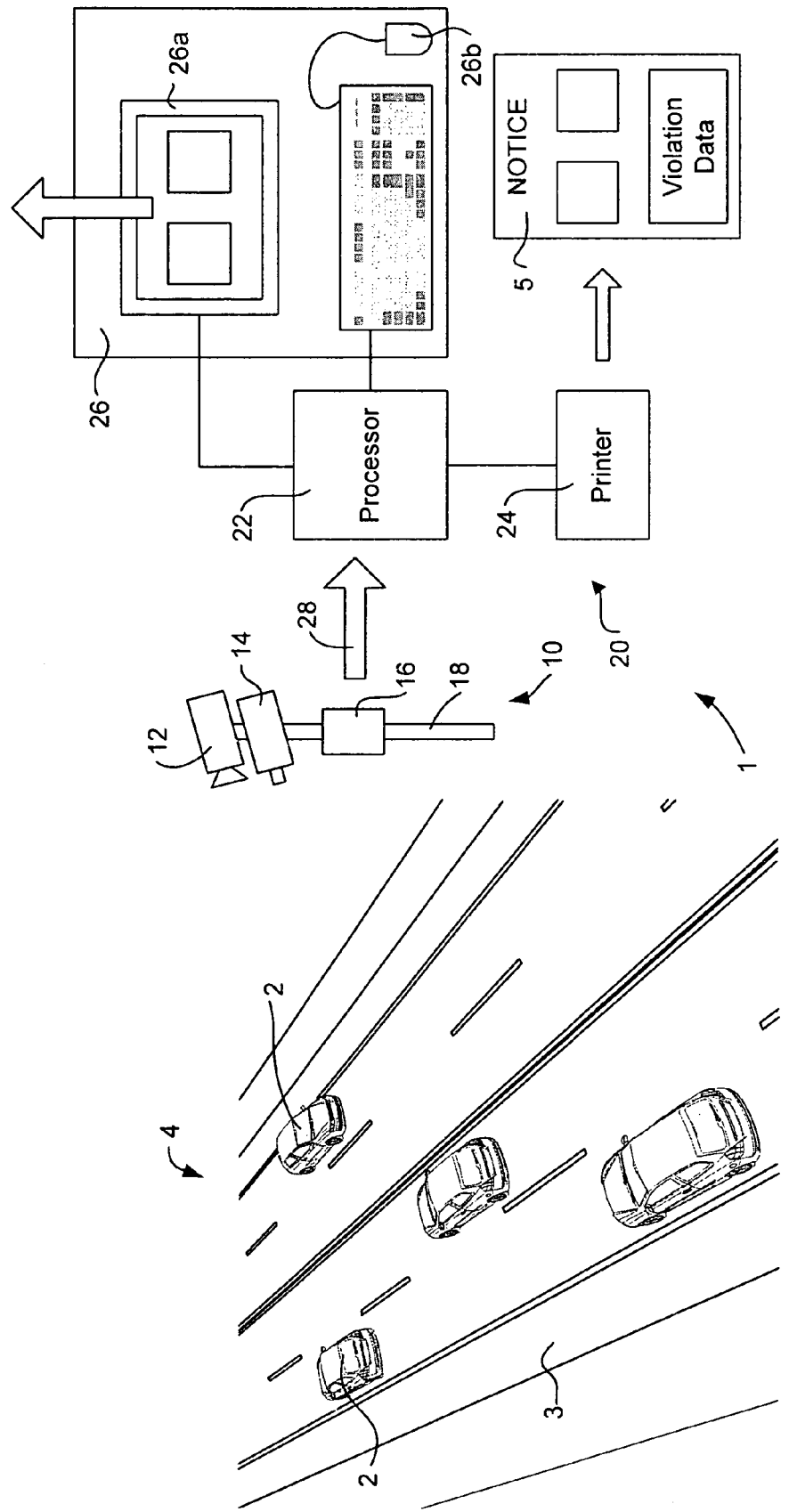
FIG. 1A is a schematic diagram of a vehicle speed assessment system.

Referring to FIG. 1A, a speed limit enforcement system 1 detects the speeds of vehicles 2 travelling on a roadway 3 at an enforcement site 4, and issues violation notices 5 to vehicles 2 that are determined to have exceeded a speed limit applicable at the site 4.

The overall system 1 may comprise a local system 10 including a primary vehicle speed detector 12, a camera 14 and a local control unit 16 provided on a pole 18 at the enforcement site 4, and a central control system 20 including a central processor 22 for processing violation data and images, a printer 24 for printing violation notices 5, and one or more operator stations 26 including a screen 26a and input devices 26b for enabling an operator to determine a secondary speed assessment and to authorize the issuance of a violation notice 5. The apparatus shown is of course representative only, and the system may be implemented using any suitable apparatus and any suitable distribution of apparatus.

The local systems 10 for a number of enforcement sites 4 may link with the central control system 20 in any suitable manner, e.g. through wireless and/or cable links 28, which may include private and/or public networks. Data may be sent to the central control system 20 in a secure and tamperproof manner at any suitable time. For example, offence data could be sent to the central control system 20 each time that an offence is detected by the local system 10 or offence data could be accumulated by the local system 10 and downloaded to the central control system 20 at set times.

The primary speed detector 12 may take any suitable form, and for example may be a radar or lidar detector, as are known in the art. The system could also use for example inductive loop sensors and/or piezoelectric strip sensors which would be provided in the roadway 3. The camera 14 may be a still camera or a video camera, and is preferably a digital camera. The control unit 16 may trigger the camera 14 to capture still images or video sequences when vehicles 2 are determined to be speeding, i.e. when a vehicle speed indicated by the primary speed detector 12 is determined to be greater than a legal speed limit set for the enforcement site 4. The control unit 16 may alternatively or also obtain image information associated with a speeding event from an image buffer in the control unit 16, which may for example temporarily hold still and/or video image data from the camera 14 for a set amount of time sufficient for example to determine whether any vehicles captured in the buffered image data are speeding.

The system 1 may utilize apparatus already existing in known photo enforcement systems, which include cameras to capture an image of offending vehicles in order to identify the vehicle from the licensee plate and possibly also to provide an identifying image of the driver.

In the present vehicle speed assessment method, as well as using vehicle images to provide identification information, the method also uses time-separated images to provide a secondary vehicle speed assessment that may be used to check the accuracy of the primary detector 12. Thus, the local control system 10 is programmed to capture at least two time-separated images A,B (refer FIGS. 1B and 1C) of each speeding vehicle 2' and to send them to the central control system 20 with appropriate offence data, e.g. the vehicle's speed as determined by the primary speed detector 12, the time and date of the potential offence, and the like. The central control system 20 then determines a secondary speed assessment based on the two time-spaced images A,B, and issues a violation notice 5 if the secondary speed assessment confirms the accuracy of the primary assessment. Accuracy may for example be confirmed if the secondary speed determination is within a set percentage of the primary speed determination, e.g. within about 2% to about 10% of the primary speed.

The images A,B may be still images taken a known amount of time apart, or may be a pair of video frames from a video sequence (spaced apart by a number of frames which can be equated to a known time period given the video frame shooting rate). The time period between the capture of images A,B may be a constant period or may be variable dependent on vehicle speed. For example, the time period may be varied so that the vehicle will have moved by a set distance or will have moved by a maximum or minimum amount. This may for example ensure that a captured vehicle's positions are an appropriate distance apart in the images to mark up the images as discussed below.

In order to make the secondary speed assessment, the images A,B are presented to an operator on screen 26a of their workstation 26. The operator chooses a vehicle reference point VRP on the offending vehicle 2', and indicates this on the first image A, e.g. using a mouse 26b.

The system 20 marks the selected vehicle reference point VRP on the first image A by a reference line 30 across the roadway 3, and indicates one or more predicted locations $VRP_{pred}$ of the vehicle reference point VRP in the second image B assuming particular speeds for the vehicle 2'. Thus, in the image B shown, a line $VRP_{pred1}$ is marked across the roadway 3 to indicate a predicted vehicle reference point location assuming that the vehicle 2' is travelling at the speed detected by the primary speed detector 12, in this case 49.7 mph (miles per hour), and another line $VRP_{pred2}$ is marked across the roadway 3 to indicate a predicted vehicle reference point location assuming that the vehicle 2' is travelling at a speed limit associated with the site 4, in this case 35 mph. For reference, a line $VRP_{org}$ is also indicated on the image B to indicate the original location of the vehicle reference point VRP from the first image A.

The lines $VRP_{pred1}$ and $VRP_{pred2}$ effectively define speed fronts that the vehicle reference point VRP would have reached if the vehicle were indeed travelling at its detected speed or at the speed limit. This provides a clear visualisation of the actual speed of the vehicle, and by comparing the actual location of the vehicle speed reference point VRP in the image B with the predicted locations $VRP_{pred1}$ and $VRP_{pred2}$ marked on the image B, the operator can determine whether the vehicle 2' was travelling at the speed of the primary assessment and whether an offence has occurred.

Figure 1B:
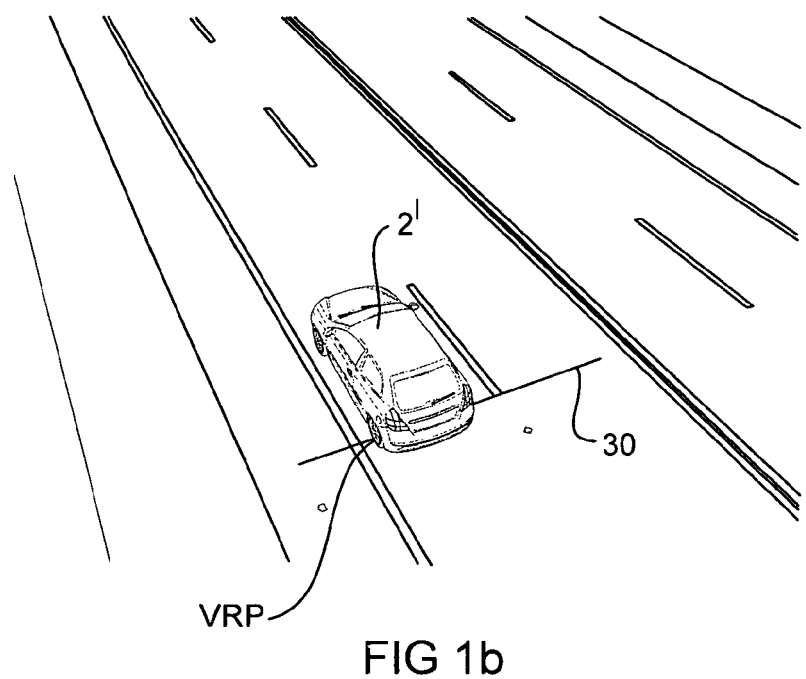
FIGS. 1B and 1C show first and second images respectively of a vehicle whose speed is to be assessed.
Figure 1C:
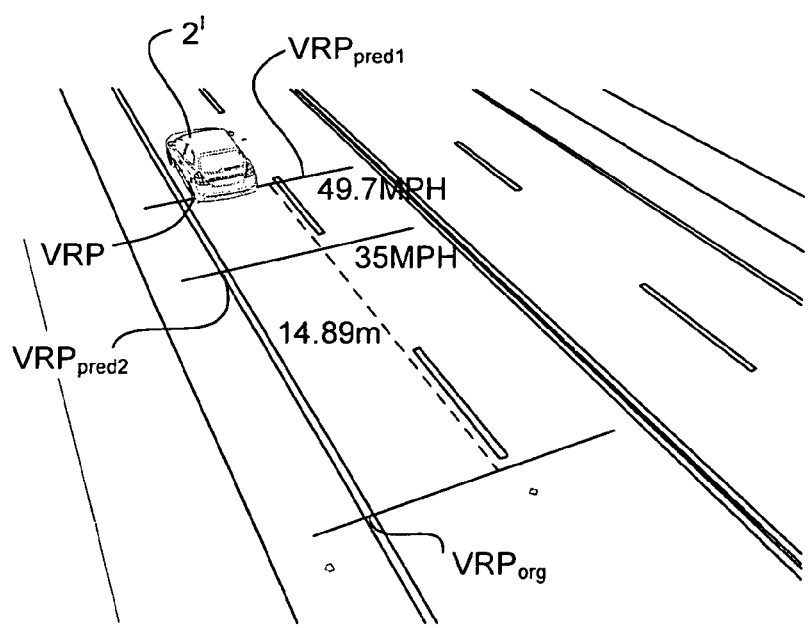

In the image B shown in FIG. 1C, for example, it would be clear to an operator that the actual location of the vehicle reference point VRP does indeed match with the predicted location $VRP_{pred1}$, and so it can be deduced that the vehicle 2' was indeed travelling at the primary detection speed of 49.7 mph. Furthermore, the image B makes clear that whatever the actual speed of the vehicle 2', it was travelling significantly faster than the set speed limit of 35 mph, as the vehicle 2' is a significant distance along the roadway 3 past the marker $VRP_{pred2}$ that indicates the vehicle reference point assuming that the vehicle is travelling at the speed limit of 35 mph.

The operator can therefore confirm that an offence has occurred, and the system 20 will generate the offence/violation notice 5 on the printer 24. The notice 5 may be of a simple form, and may merely indicate details of the offence and the fine. The offence notice 5 could also however include image data showing the offence. The notice 5 may for example include image B, or both images A and B, or a composite of the two, and the images may include the various markers showing the vehicle reference point chosen by the operator and the predicted locations of the vehicle reference point. This would provide the offender with visual evidence of the offence, and also allow the offender to understand from the markers how the speed determination process was performed. Similar images may also or alternatively be provided in the event of a challenge to a violation notice, and for example may be sent to an offender if they query the notice or may be produced in court proceedings.

As the process for deciding on an infringement notice includes a human step, it may also help to convince an offender that appropriate care has been taken in the issuance of the notice 5, and that it is not merely the result of an unverified automatic process.

Further, errors in any human input to the decision process are kept to a minimum by requiring the operator to only take a single positive selection action (the identification of the vehicle reference point), and by then automatically determining predicted locations for the vehicle and displaying them for an operator so that the operator need only then visually compare actual and predicated locations of the vehicle reference point in order to determine whether an infringement has occurred.

The use of lines 30 and $VRP_{pred1}$ and $VRP_{pred2}$ across the roadway 3 to mark the selected VRP and its predicted VRP locations aids the operator in indicating the vehicle reference point and in comparing its actual position to the predicted positions, as the lines provide perspective information and visual aids to the operator in their determinations.

In order to predict locations of the selected vehicle reference point VRP in the second of the time-separated images B, the system 1 determines a perspective transform that maps real world locations at the enforcement site 4 with pixel locations in the images A,B of the site 4.

Figure 2:
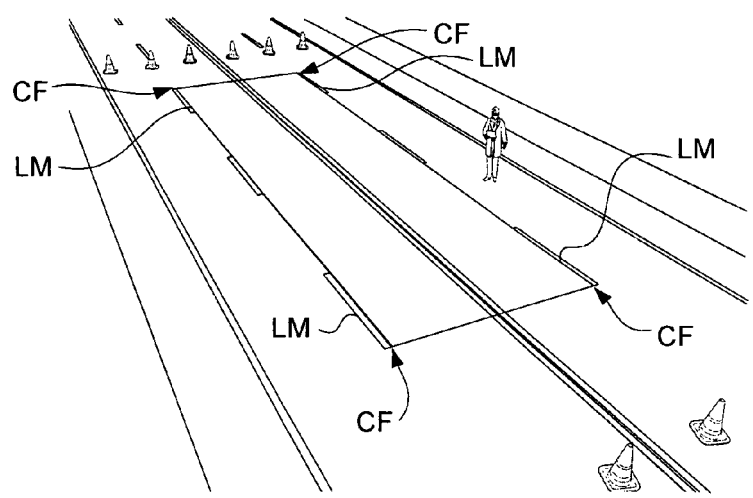
FIGS. 2 to 4 show various methods for calibrating an image of an enforcement site and of providing a perspective transform.
Figure 3:
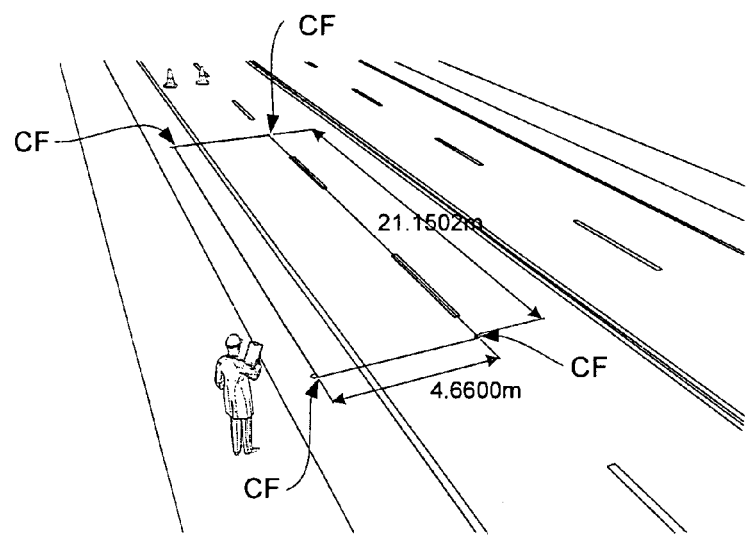
Figure 4:
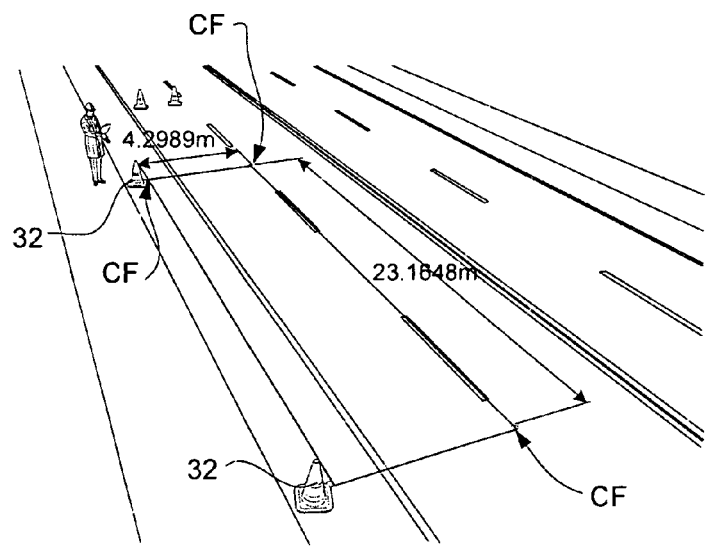

The transform may be obtained by identifying real-world calibration features CF in an enforcement site 3, as shown in FIGS. 2 to 4, that are at known distances relative to one another, by associating real-world co-ordinates with the calibration features CF, by noting their corresponding image co-ordinates in images A,B of the site 4, and by determining a matrix transform for mapping between the two sets of co-ordinates. The determination of such perspective transforms are well-known, and may be implemented in a standard manner as known to one skilled in the art.

The calibration features CF may take any suitable form. As shown in FIG. 2, they may be existing features in the site 4, such as the corners of lane markings LM. They may also be dedicated calibration marks CF, as shown in FIG. 3, or a combination of the two, as shown in FIG. 4. The calibration features CF in FIGS. 2 and 3 are permanent marks on the roadway 3, whereas the calibration features CF in FIG. 4 (inside corners of traffic cones 32) are temporary only, and are provided only whilst calibration takes place.

Preferably, the calibration features CF are provided at a rectangular set of points, with the points spaced sufficiently far apart to provide the transform with a desired level of accuracy. Each corner of the rectangle is assigned a real-world co-ordinate. The point of origin may be selected depending on the direction of traffic being measured, so that, for example, if receding traffic in the left hand lane in FIGS. 2 to 4 are being monitored, the point of origin is set in the bottom left hand corner of the rectangle. In this case, the co-ordinates in the FIG. 3 example would be, anticlockwise from the bottom left hand corner: (0, 0), (4.66, 0), (4.66, 21.1502) and (0, 21.1502). These features CF are identified on an image of the site 3 produced by the camera 14, e.g. by an operator clicking on the imaged features CF, and the image co-ordinates for each feature CF are determined. For example the FIG. 3 calibration features may map to pixel locations (265, 476), (477, 423), (271, 149) and (166, 166). A transfer matrix for transforming the real-world coordinates to the image co-ordinates may then be determined from the two sets of co-ordinates, and this may be used in the prediction calculations to map between the two co-ordinate systems.

In order to predict future locations of the vehicle reference point assuming a certain vehicle speed, the real-world distance that the vehicle would travel at that speed over the time between the two images A,B is determined, and this is then transformed to a distance in the image. The predicated location is then the sum of the original image location and the transformed image distance.

In order that a simple transform may be used, the method may map between a flat plane at the site 4 and the image B. The method may for example assume that the roadway 3 on which the vehicle 2' is travelling is flat and may provide a transform between points on the roadway 3 and points in the image B. In this regard, the vehicle reference point VRP selected by the operator may be restricted to a point at which the vehicle 2' contacts the roadway 3. This will generally be at a point of contact of a tyre of the vehicle with the roadway 3. Any wheel of the vehicle 2' that is visible may be utilized, and the method may use the front or back wheel. It would also be possible to select a VRP for both the front and rear wheels and to provide predicted locations for both, so as to provide an extra check.

When imaging receding vehicles, it may be preferable to choose a vehicle reference point on a rear wheel, and when imaging approaching vehicles, it may be preferable to choose a vehicle reference point on a front wheel. This then allows the various line markers used in the speed determination to be displayed and viewed without too great an interaction with the image of vehicle body, which might provide a distraction to an operator when placing and comparing markers. Also, these wheels will generally be larger in the image then the wheels at the other end of the vehicle, and so will facilitate greater selection accuracy.

The use of calibration points CF across the lanes, as in FIG. 2, may require the closing of a whole roadway 3, whereas the use of calibration points only in a single lane of the roadway 3, as in FIGS. 3 and 4, may cause less disruption.

FIGS. 5A and 5B again show the images A and B of FIGS. 1B and 1C, but in this case the area around the vehicle reference point VRP in the two images has been enlarged in inserts 50 and 52, so as to aid in the accurate selection of the vehicle reference point VRP, e.g. at the pixel level, and the comparison of an actual and predicted location of the vehicle reference point VRP. When storing images of an offence, more detailed image data may be retained for areas of interest, such as around the VRP, and this may be achieved by for example image recognition software that may identify the areas around a vehicle's tyres.

Figure 5A:
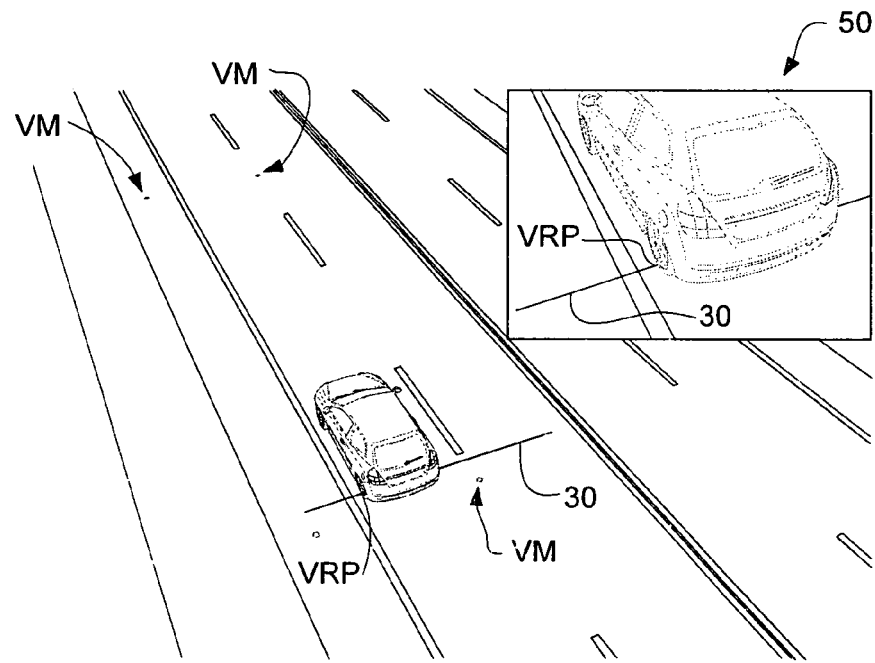
FIGS. 5A and 5B show first and second images respectively of a vehicle whose speed is to be assessed, each image including an insert relating to an enlarged area of the image about a point of interest.
Figure 5B:
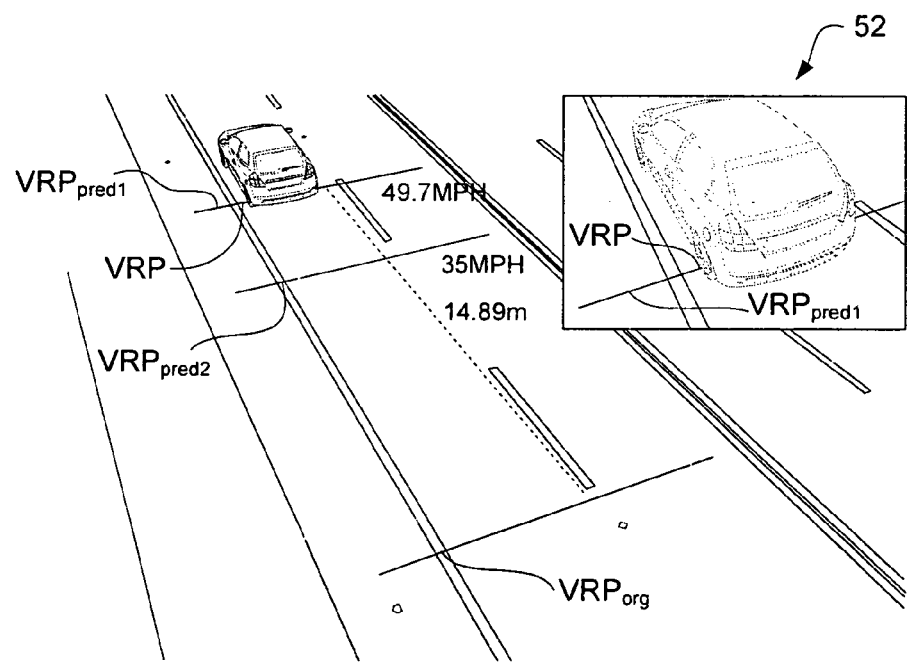
Figure 6A:
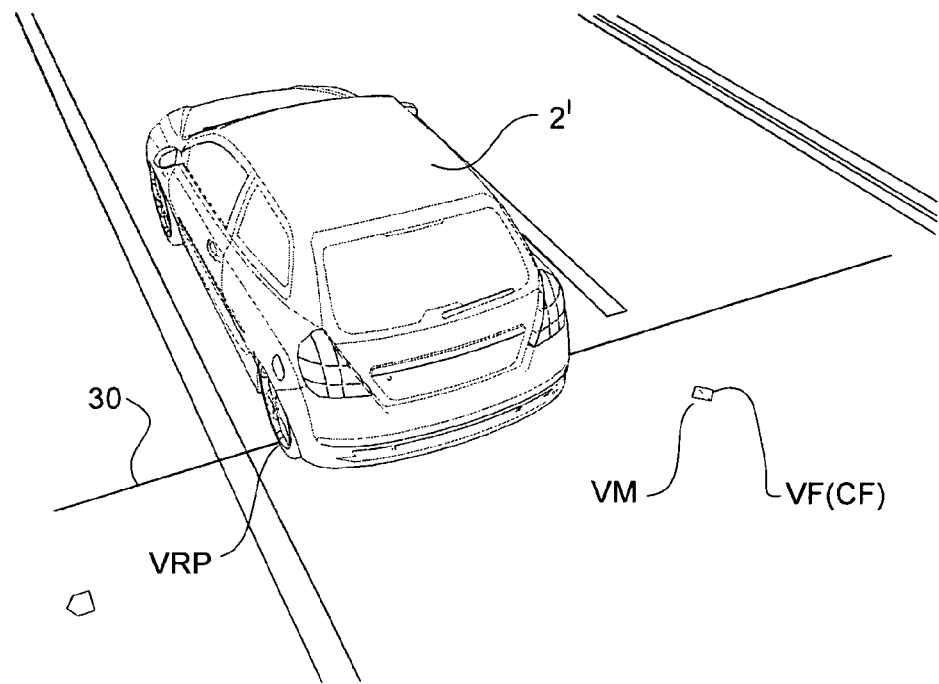
FIGS. 6A and 6B show an enlargement of the vehicle images of FIGS. 5A and 5B for clarity.
Figure 6B:
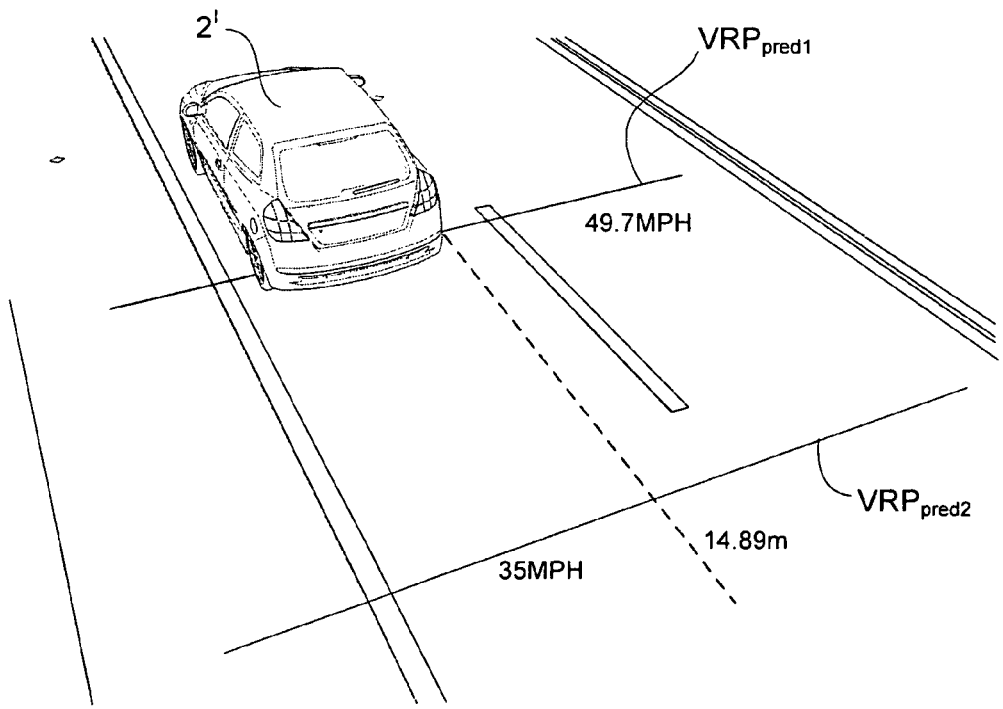

FIGS. 6A and 6B show magnified portions of the images A,B of FIGS. 5A and 5B, which clearly shows the various markers used in the images. In order to confirm that the camera 14 is correctly calibrated, and has not been moved, the images A,B also include image verification markers VM that indicate where verification features VF at the site 4 should appear in the images A,B. Thus, if the camera 14 has moved, the verification markers VM and verification features VF will not register with one another, and the operator will know that a speed assessment cannot be made, as the perspective transform will be incorrect. In the image shown, the calibration features CF used to determine the perspective transform are used as the verification features VF, and, as can be seen in image A of FIG. 6A, the verification marker VM is in registration with the calibration feature CF. Therefore, any assessments of vehicle speed using the images A,B will be valid, as the camera will not have moved, and the registration of the features with the markers will be able to pre-empt challenges of miscalibration.

Figure 7A:
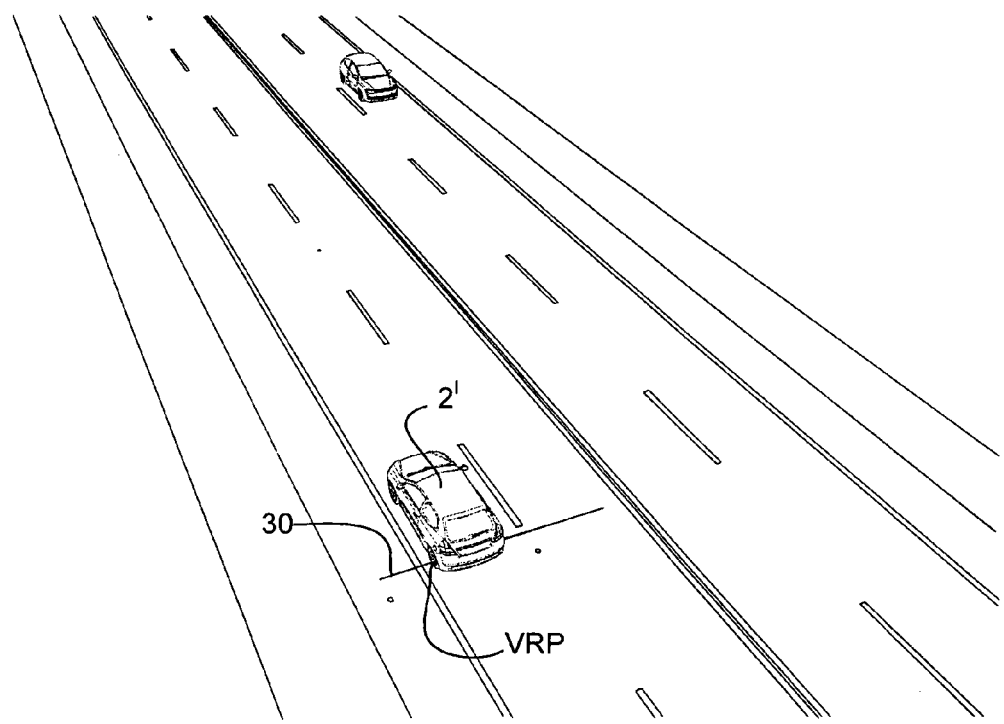
FIGS. 7A and 7B show first and second images respectively of a vehicle where a speed violation is positively determined.
Figure 7B:
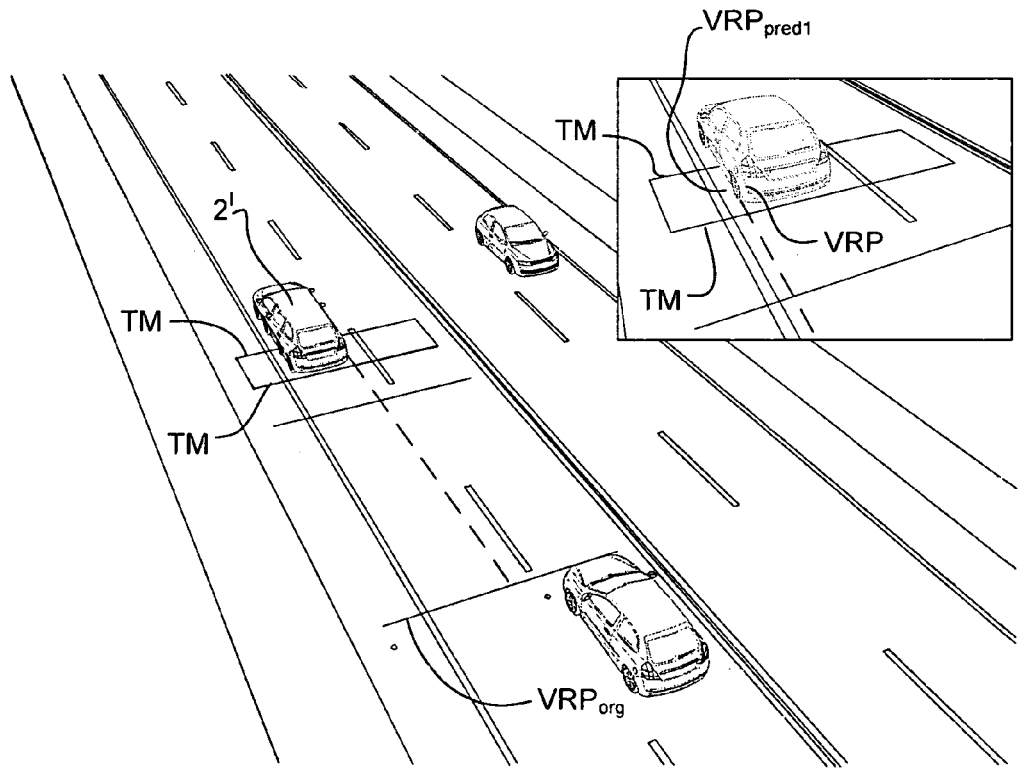

FIGS. 7A and 7B show a pair of images A,B, in which tolerance markers TM are provided about predicted locations of the vehicle reference point VRP. These tolerance markers TM take the form of lines parallel to the predicted location lines, but positioned assuming vehicle speeds of plus and minus a set percentage of the detected primary speed, e.g. about 2% to about 10% of the detected primary speed. If the actual location of the vehicle reference point VRP falls within the tolerance markers TM, then it can be concluded that the secondary vehicle speed assessment is within the required percentage of the primary assessment speed for speed verification, and so the operator can issue a violation notice 5.

Figure 8A:
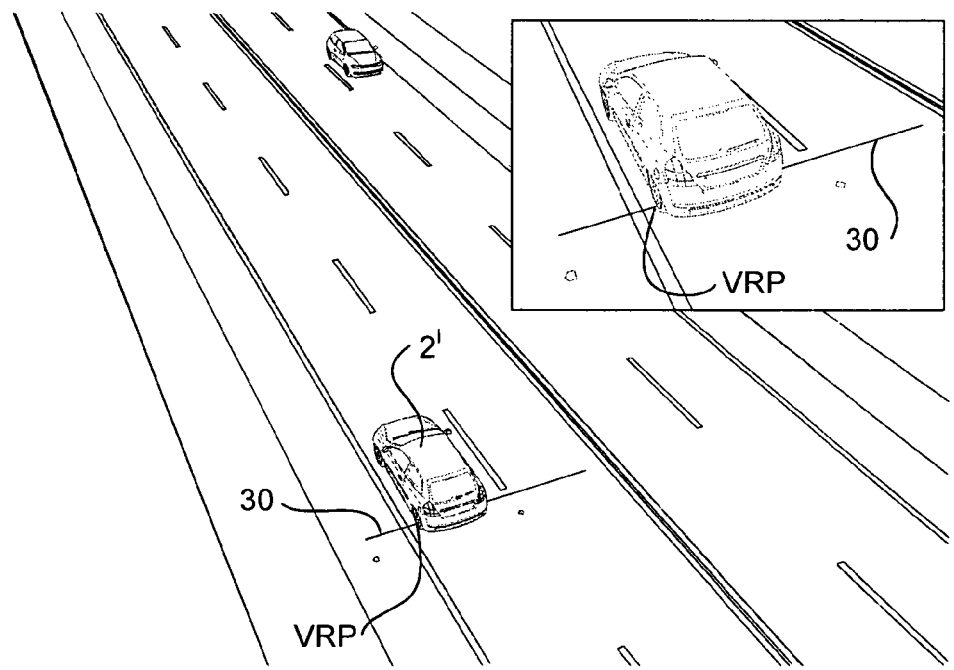
FIGS. 8A and 8B show first and second images respectively of a vehicle where a speed violation is not confirmed.
Figure 8B:
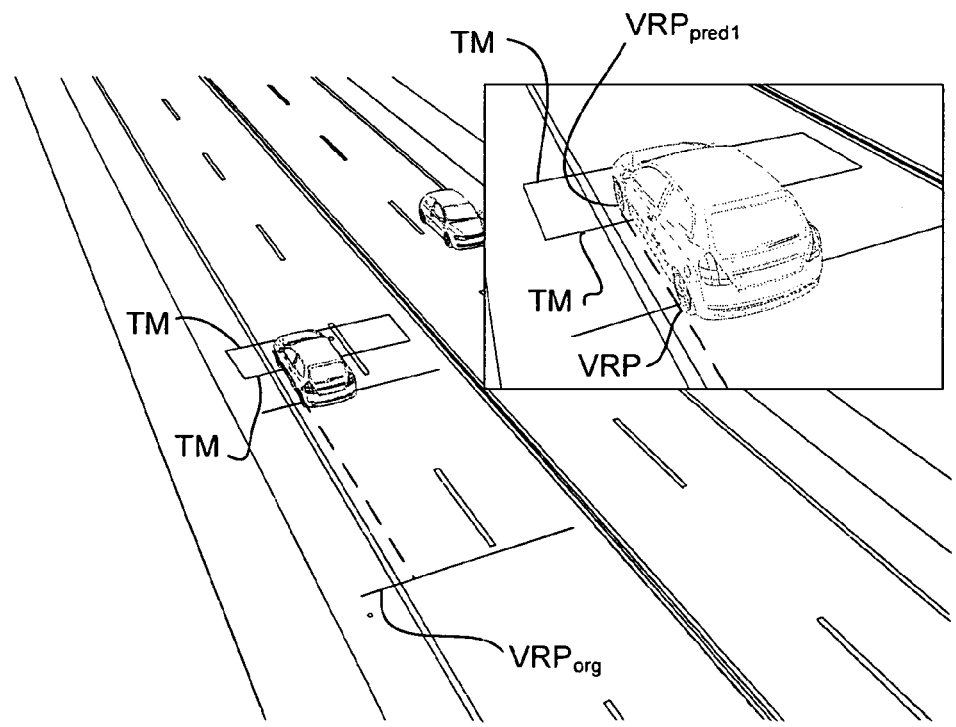

FIGS. 8A and 8B shows a pair of images A,B in which the secondary speed assessment suggests that the vehicle 2' was not speeding, even though the primary detection system 12 may have measured a greater speed. Accordingly, the operator will indicate that the speed assessment has failed to find a violation, and no notice 5 will be issued.

Figure 9A:
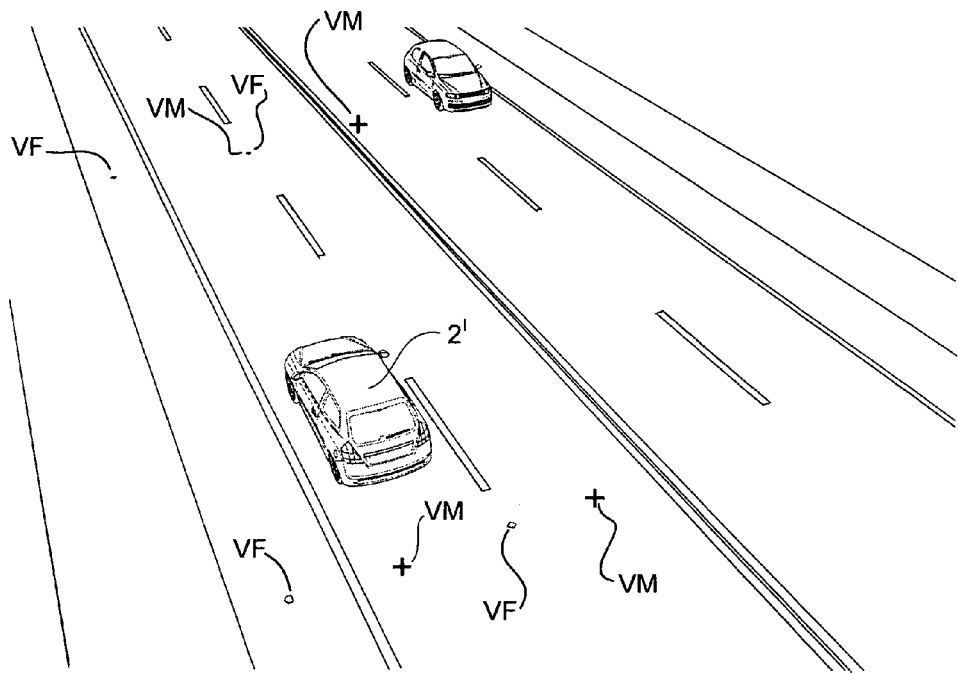
FIGS. 9A and 9B show first and second images respectively of a vehicle where a speed assessment cannot be made due to failure of a calibration test.
Figure 9B:
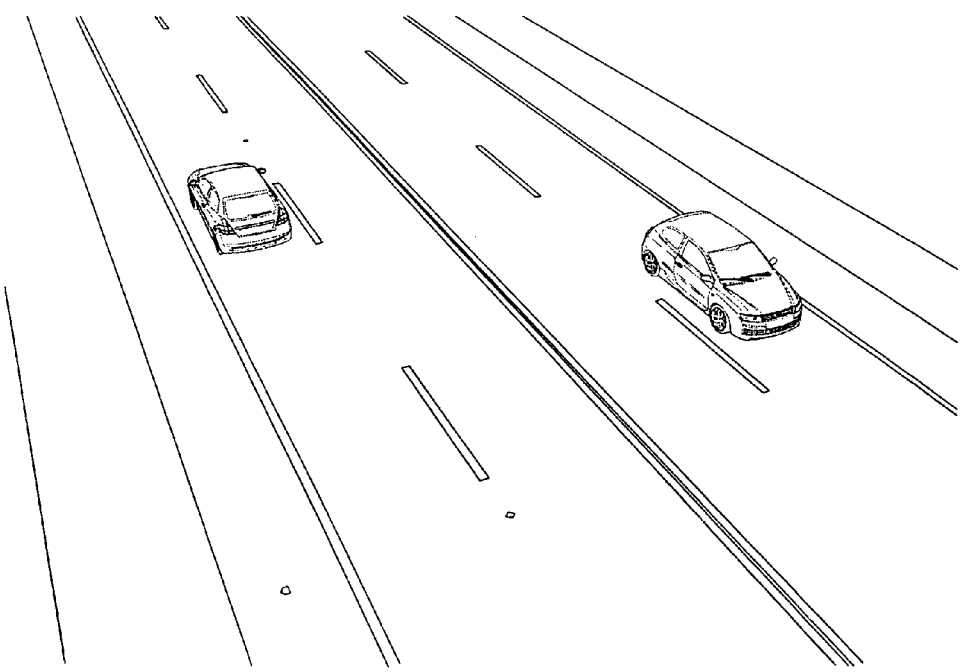

FIGS. 9A and 9B show a pair of images A,B in which the system 1 is determined to be miscalibrated, so that no secondary speed assessment can be made. Miscalibration can be determined by comparing the actual location of a verification feature VF in the image A or B with an image verification marker VM that indicates the expected feature location in the image.

In this case, if the calibration features CF are permanent, then the images A,B can be recalibrated. The calibration features may also then be used as the verification features also.

In an alternative verification method, a description could be provided of what feature of the site 4 should be seen at a verification maker VM, which may be for example a box in which the feature should be seen.

Figure 10:
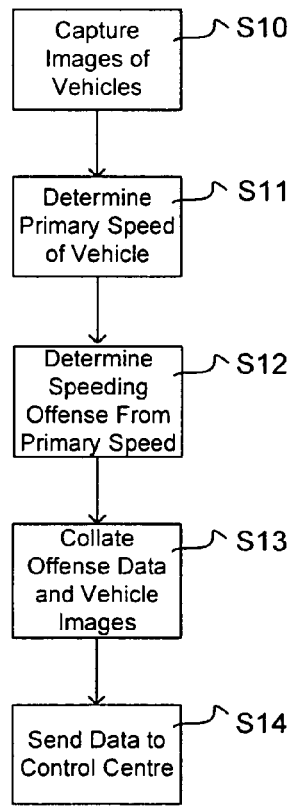
FIG. 10 is a flowchart of a process performed by a local enforcement system in carrying out a vehicle speed assessment according to a first method.
Figure 11:
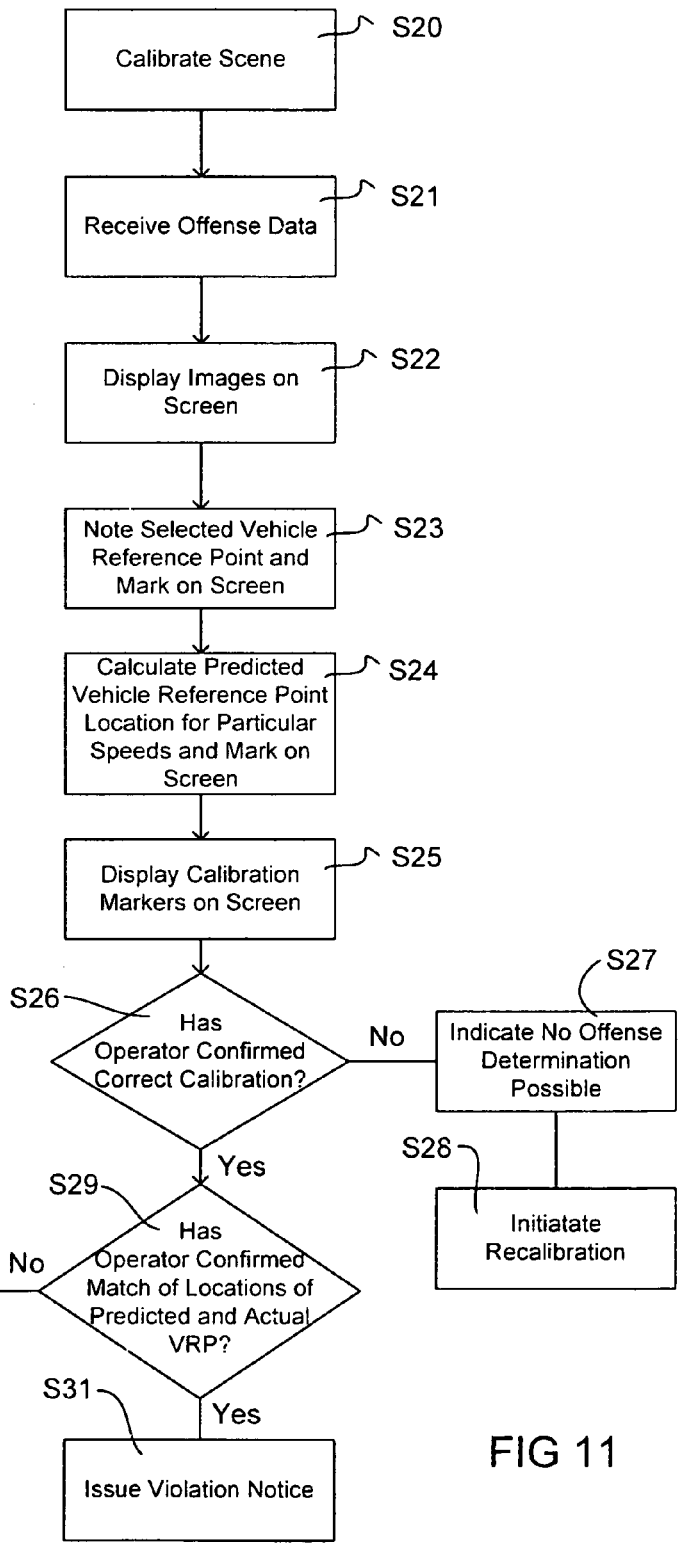
FIG. 11 is a flowchart of a process performed by a central control system in carrying out a vehicle speed assessment method according to the first method.

FIGS. 10 and 11 are flowcharts showing the steps carried out by the local system 10 and the central control system 20 in implementing a speed assessment method. Thus, the method can be carried out by including software in the local controller 16 and in the central processor 22 and workstations 26 that implement the steps in the flowcharts. The method can therefore be implemented by providing a suitable software product, the software having components for carrying out the various actions required by the method.

In step S10, the local controller 16 captures images of vehicles 2 at the site 4 using the camera 14, and, in step S11, the controller 16 determines a primary speed assessment for vehicles 2 using the primary speed detector 12. The controller 16 then determines in step S12 whether an offence may potentially have been committed, e.g. by comparing the primary speed assessment with a speed limit of the site 4, and, if so, collates together the offence data and at least two time-separated vehicle images at step S13. The controller 16 then sends this information to the central control system 20 at step S14 for speed verification and violation notice generation.

The central control system 20 will calibrate images from enforcement sites at step S20 so as to provide suitable perspective transforms for them, and will then receive offence data and images from the local site controllers 16 at step S21. The system will display site images A,B on an operator workstation screen at step S22, and will note and mark on the first image A a vehicle reference point VRP selected by the operator at step S23. At step S24, the system 20 will calculate a predicted location of the vehicle reference point based on the primary speed assessment of the vehicle and the time between images A and B, and will mark this location on image B. The system 20 may also calculate a predicted location of the vehicle reference point based on a speed limit associated with the relevant enforcement site 4, and may also mark this on the image B. These markings may also be accompanied by tolerance markers, e.g. indicating locations for a percentage of the relevant speed, e.g. ±2% to 10% of the relevant speed. At step S25, the system 20 will also display verification markers on the images A,B corresponding to the expected locations of verification features in the sites 4, e.g. permanent calibration features.

At step S26, the system 20 will monitor as to whether or not the operator indicates that the verification markers and features correctly register with one another and so confirm correct calibration of the system. If not, the system indicates that no secondary speed assessment is possible at step S27 and initiates a recalibration process at step S28, which may be an automatic recalibration or may require a service engineer to attend the site 4 and reposition the camera 14. If there is correct calibration, the process proceeds to step S29, where the system monitors for operator confirmation that the actual vehicle reference position matches the predicted location for the primary speed assessment. If the operator indicates that this is not the case, the process indicates no offence in step S30, and does not issue a violation notice 5, whereas if the operator indicates a match, the process issues a violation notice at step S31.

Variations on this method are possible, and FIG. 12 shows a simplified flowchart for an overall system in which an operator moves a speed marker in the second image B until it matches an actual location of the vehicle reference point.

In this method, the system calibrates images for enforcement sites at step S40, captures images of a potentially speeding vehicle at step S41, and requires an operator to select a vehicle reference point VRP in a first image A at step S42, e.g. as in the above method. The system then however displays a speed marker in the second image B. This speed marker may again be a line across the roadway, and in this method is movable along the roadway by the operator. This allows the operator in step S43 to move the speed marker to align with the actual position of the vehicle reference point in the second image B. Once this is done, the system determines the speed of the vehicle from the position of the speed marker, and indicates this speed to the operator.

This speed could be used as a primary speed assessment, and may be compared against a speed limit of the site 4 to determine if an offence has occurred at step S45. The speed assessment could also be a secondary speed assessment, in which case the system may compare it with a primary speed assessment, and, if within a set percentage of one another, e.g. within about 2% to about 10%, the system may determine that an offence has occurred and e.g. may issue a violation notice.

The speed marker may be initially displayed at a home position from which the operator may move it to the actual vehicle reference point position. This home position could for example be at a predicted location for the vehicle reference point assuming that the vehicle was travelling at the speed limit for the corresponding enforcement site. Alternatively, the speed marker could be places at a predicted location of the vehicle reference point VRP assuming that the vehicle travels at a detected speed of the vehicle.

FIG. 13 shows a simplified flowchart for another assessment method, which is similar to that of FIGS. 10 and 11, except that predicated and actual vehicle reference point locations are compared over a number of image frames.

Thus, in step S50, the site images are calibrated and in step S51 vehicle images are captured. In step S52, a primary speed assessment is made, and in step S53 an operator identifies a vehicle reference point VRP. At step S54, a predicated location of the vehicle reference point is indicated in a number of subsequent images based on the primary speed assessment and on the time between the capture of the images. At step S55, an operator determines if the predicted locations track the actual locations of the vehicle reference point across the multiple images. If so, then the accuracy of the primary assessment can be confirmed at step S56, and for example a violation notice issued. The plurality of images may form a video sequence that the operator may watch, and for example each frame in a video sequence may include the required location markers and the like. As with static images, the video sequence may be used as evidence of the offence, e.g. before an enforcement authority.

FIG. 14 shows a simplified flowchart for a further assessment method, in which a number of predicted locations for a vehicle reference point are included in an image, each predicated location corresponding to a particular vehicle travel speed between capture of the images. This may for example provide a scale of speed locations against which the vehicle position may be compared so as to establish the vehicle speed within speeds on the scale. This scale may be used by itself or with one of the other embodiments, e.g. to provide a moving speed marker on the scale or a fixed predicted speed location on the scale.

In this method, in step S60, site images are calibrated to provide the required transforms, and, in step S61, vehicle images are captured for assessment. In step S62, an operator selects a vehicle reference point VRP in a first image, and, in step S63, a scale is generated on a second image that indicates the predicted position of the vehicle reference point VRP assuming a number of vehicle travel speeds between the two images. In step S63, the operator will determine a vehicle speed from a comparison of the actual location of the vehicle reference point in the second image with the scale, and will indicate this to the system, e.g. by inputting a speed, by confirming that the speed is within a set percentage of a primary speed determination or by clicking on a portion of the scale corresponding to where the vehicle reference point is actually positioned.

The scale may be drawn so that an axis of the scale, along which for example speeds may be marked, extends in the direction of the roadway. Significant speeds may be marked on the scale, e.g. a primary speed determination, one or more speed limits, and tolerances about these speeds.

The above described methods and systems are examples of how a vehicle speed assessment may be carried out and confirmed, and variations on the above are possible. For example, the speed detector 12 may be oriented against the traffic flow rather than with it, so as to detect speeds from approaching traffic rather than receding traffic. The camera 14 could also face the approaching traffic, and more than one camera 14 could be provided, e.g. one in each direction of traffic flow. The camera 14 could include both wide-angle and telephoto lens, so that the former may determine an overall image of the vehicle 2 on the roadway 3, whilst the latter may be used to obtain a close-up of a licensee plate or of a driver's face or of an area of the vehicle that may need to be inspected in detail, e.g. when selecting a vehicle reference point or when comparing a selected reference point with a predicted speed marker.

Also, although it is preferred to use a human operator to select vehicle reference points and to compare actual and predicted locations, these procedures may be automated, e.g. by using image recognition software. This may be facilitated by the use of vehicle tyres and their contact points with the road surface for the vehicle reference points, as the wheel tyres and the contact points may have well-defined features that can be searched for by the recognition software. In this case, there may be no need to display images and markers, but this may however still be done when for example evidence of an offence is needed, or to allow a human operator to oversee the procedures. Human operation and automation may be combined by having automatic detection of points and positions that may be confirmed and/or overridden by an operator.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The present application may be used as a basis for priority in respect of one or more future applications, and the claims of any such future application may be directed to any one feature or combination of features that are described in the present application. Any such future application may include one or more of the following claims, which are given by way of example and are non-limiting with regard to what may be claimed in any future application.

The invention claimed is:

1. A method of verifying speed of a vehicle to provide independent verification of speed detected by a primary speed assessment system, said primary speed assessment system using a primary speed detector to detect speed of said vehicle, said method using a secondary speed assessment system independent of said primary speed detector, said method including:
    obtaining, using said secondary speed assessment system, first and second images of said vehicle, said second image being captured at a known time after said first image is captured;
    selecting a reference point on said vehicle in said first image;
    determining a location in said second image corresponding to an expected location of the selected reference point, based on the speed detected by the primary speed assessment system within a set percentage of the speed detected by the primary speed assessment system, in the time period between the capturing of said first and second images; and
    comparing an actual location of said reference point in said second image with the expected location, such that if the actual location corresponds to the expected location, it may be concluded that the vehicle was travelling at the speed detected by the primary speed assessment system.

2. The method of claim 1, including displaying said first image to an operator, wherein said operator selects said reference point on said vehicle.

3. The method of claim 1, including displaying said second image to an operator, wherein said operator visually determines whether or not the expected location indicated on said second image matches the actual location of said reference point in said second image.

4. The method of claim 1, wherein the expected location is indicated by a line in the second image.

5. The method of claim 1, wherein the expected location is determined assuming that said vehicle is travelling at a fixed speed.

6. The method of claim 1, including the step of indicating a tolerance region in the second image around the expected location.

7. The method of claim 1, including the step of providing tolerance markers in the second image about the expected location.

8. The method of claim 1, wherein said reference point is a point of contact of said vehicle with a road surface.

9. The method of claim 1, including the step of determining a perspective transform for mapping real world location points in an enforcement site at which said method is performed with pixel locations in an image of said site.

10. The method of claim 1, including identifying calibration markers having known distance relationships in an imaged scene, determining pixel locations in an image of the scene that correspond to said calibration markers having known distance relationships in an imaged scene, and determining a perspective transform between real world locations of said calibration markers in said imaged scene and said pixel locations.

11. The method of claim 1, including determining whether or not a calibration verification feature of an imaged scene is at an expected pixel location in the corresponding image of the scene.

12. The method of claim 1, including the step of enlarging an image portion about a point on the image portion that is to be selected or that is to be matched.

13. The method of claim 1, including the step of providing a composite image including said vehicle both in a first position corresponding to said vehicle's position in said first image and in a second position corresponding to said vehicle's position in said second image.

14. The method of claim 1, wherein vehicle images are obtained from a still camera.

15. The method of claim 1, wherein vehicle images are obtained from frames of a video camera.

16. The method of claim 1, including the step of obtaining one or more further images of said vehicle, and of indicating in each image an expected location of the selected reference point.

17. The method of claim 1, wherein a plurality of expected locations of said reference point are indicated on an image, each of the expected locations corresponding to a different vehicle speed.

18. The method of claim 1, wherein a marker corresponding to the expected locations of said reference point is movable in said image.

19. A speed verification system for providing independent verification of speed detected by a primary speed assessment system, said primary speed assessment system using a primary speed detector to detect speed of a vehicle, said speed verification system using a secondary speed assessment system independent of said primary speed detector, said verification system including:
  capturing means using said secondary speed assessment system for obtaining first and second images of said vehicle, said second image being captured a known time after said first image is captured;
  selecting means for selecting a reference point on said vehicle in said first image;
  determining means for determining a location in said second image corresponding to an expected location of the selected reference point, based on the speed detected by the primary speed assessment system within a set percentage of the speed detected by the primary speed assessment system, in the time period between the capturing of said first and second images, and
  comparing means for comparing an actual location of said reference point in said second image with the expected location such that if the actual location corresponds to the expected location, it may be concluded that the vehicle was travelling at the speed detected by the primary speed assessment system.

20. The apparatus of claim 19, including display means for displaying said first image to an operator, and input means for allowing an operator to select said reference point.

21. The apparatus of claim 19, including display means for displaying said second image to an operator, and input means for allowing an operator to indicate whether or not an actual location of said selected reference point matches the expected location.

22. A non-transitory computer readable medium containing software including a series of instructions executable by a processor to carry out a method according to claim 1.

* * * * *